(12) United States Patent
Bolotov et al.

(10) Patent No.: US 8,023,644 B2
(45) Date of Patent: Sep. 20, 2011

(54) MULTIMODE BLOCK CIPHER ARCHITECTURES

(75) Inventors: Anatoli A. Bolotov, Cupertino, CA (US); Mikhail I. Grinchuk, San Jose, CA (US); Lav D. Ivanovic, Sunnyvale, CA (US); Paul G. Filseth, Los Gatos, CA (US); Anton I. Sabev, Santa Clara, CA (US)

(73) Assignee: LSI Corporation, Milpitas, CA (US)

( * ) Notice: Subject to any disclaimer, the term of this patent is extended or adjusted under 35 U.S.C. 154(b) by 982 days.

(21) Appl. No.: 11/928,628

(22) Filed: Oct. 30, 2007

(65) Prior Publication Data

US 2008/0130872 A1 Jun. 5, 2008

Related U.S. Application Data

(60) Provisional application No. 60/868,481, filed on Dec. 4, 2006.

(51) Int. Cl.
*H04L 9/00* (2006.01)
(52) U.S. Cl. .......................................................... 380/28
(58) Field of Classification Search ..................... 380/28
See application file for complete search history.

(56) References Cited

U.S. PATENT DOCUMENTS 7,242,766 B1 * 7/2007 Lyle .................................. 380/2

* cited by examiner

*Primary Examiner* — Jacob Lipman
(74) *Attorney, Agent, or Firm* — Luedeka, Neely & Graham, P.C.

(57) ABSTRACT

An architecture for a block cipher, where the architecture includes functional units that are logically reconfigurable so as to be able to both encrypt clear text into cipher text and decrypt cipher text into clear text using more than one block cipher mode based on at least one of advanced encryption standard and data encryption standard.

1 Claim, 6 Drawing Sheets

Electronic Codebook Mode (ECB)

Fig. 1 (Prior Art)

Counter Mode (CTR)

Fig. 2 (Prior Art)

Cipher Block Chaining Mode (CBC)

Fig. 3 (Prior Art)

Output Feedback Mode (OFB)

Fig. 4 (Prior Art)

Cipher Feedback Mode (CFB)

Fig. 5 (Prior Art)

Advanced Access Content System (AACS AES-H)

MULTIMODE BLOCK CIPHER ARCHITECTURES

This application claims all priorities and other benefits of prior U.S. provisional application 60/868,481, filed 2006 Dec. 4.

FIELD

This invention relates to the field of integrated circuit design. More particularly, this invention relates to architectures for multimode block cipher units.

BACKGROUND

A block cipher is a cryptographic algorithm that encrypts or decrypts a fixed number of bits at a time, typically sixty-four or one-hundred and twenty-eight bits. The most common block ciphers in current use are the Data Encryption Standard (DES) and the Advanced Encryption Standard (AES). A block cipher "mode" is a convention for extending a block cipher so that it can process two or more blocks of data. Modes are typically designed to ensure that two or more input blocks that contain copies of the same data are encrypted differently, so that when the same data is encrypted more than once, this fact is not detectable by an unauthorized reader.

Many such modes have been published, each with its individual advantages and disadvantages. For example, the National Institute of Standards and Technology (NIST) published "SP 800-38A," in which five modes (named Electronic Code Book, Counter Mode, Cipher Block Chaining Mode, Output Feedback Mode, and Cipher Feedback Mode) are defined and recommended. These modes have been widely adopted, and are graphically depicted in FIGS. 1 through 5, respectively. Various communication and storage protocol standards specify the use of a particular one of these different modes.

There is a need, therefore, for computing devices that implement block cipher modes. Each of these computing devices falls into one of two basic categories, being (1) software running on a general-purpose computer, and (2) special-purpose hardware.

The disadvantage of software running on a general-purpose computer is that it tends to be relatively slow. The disadvantage of existing special-purpose hardware is that there are many different modes, and a different hardware set tends to be needed to implement each different mode, so hardware solutions typically support only one mode or a small number of modes. Furthermore, new modes are continuing to be invented, and modifying an existing circuit design to support an additional mode typically involves extensive—and expensive—rework.

What is needed, therefore, is a system that overcomes problems such as those described above, at least in part.

SUMMARY

The above and other needs are met by an architecture for a block cipher, where the architecture includes functional units that are logically reconfigurable so as to be able to both encrypt clear text into cipher text and decrypt cipher text into clear text using more than one block cipher mode based on at least one of advanced encryption standard and data encryption standard.

In this manner, a single implementation of the architecture is able to both encrypt and decrypt according to more than one block cipher mode. Because the functional units are logically reconfigurable, different block cipher modes can be implemented in the architecture, and even as-of-yet unknown block cipher modes might be able to be implemented in the architecture, because of its reconfigurable nature.

In various embodiments, the functional units include a state register pipeline including a first given number of state registers, a block cipher pipeline including a second given number of block cipher modules, and a commutation unit for receiving results from both the state register pipeline and the block cipher pipeline, and additionally for feeding results that are incomplete back into both the state register pipeline and the block cipher pipeline, until the results are complete. The results are considered to be complete when either an input block of clear text is completely encrypted into cipher text according to at least one of the block cipher modes, or an input block of cipher text is completely decrypted into clear text according to at least one of the block cipher modes. In some embodiments, the functional units include auxiliary data path arithmetic units and storage units for supporting the block cipher modes that need such units. In some embodiments the block cipher modes include at least one of electronic code book, counter mode, cipher block chaining mode, output feedback mode, cipher feedback mode, and advanced access content system. In some embodiments the architecture is implemented in a monolithic integrated circuit.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Embodiments of the present invention provide a hardware architecture that implements block cipher modes in special-purpose hardware, which special-purpose hardware is formed of basic components. The basic components are variously selectable and recombine-able to implement a variety of different modes. Further, the basic components are sufficiently "general-purpose" so that they can be used to implement into the existing architecture new modes that may be required in the future. Thus it's possible to extend an existing device's capabilities in the field, such as by means of a firmware update.

Figure 1:
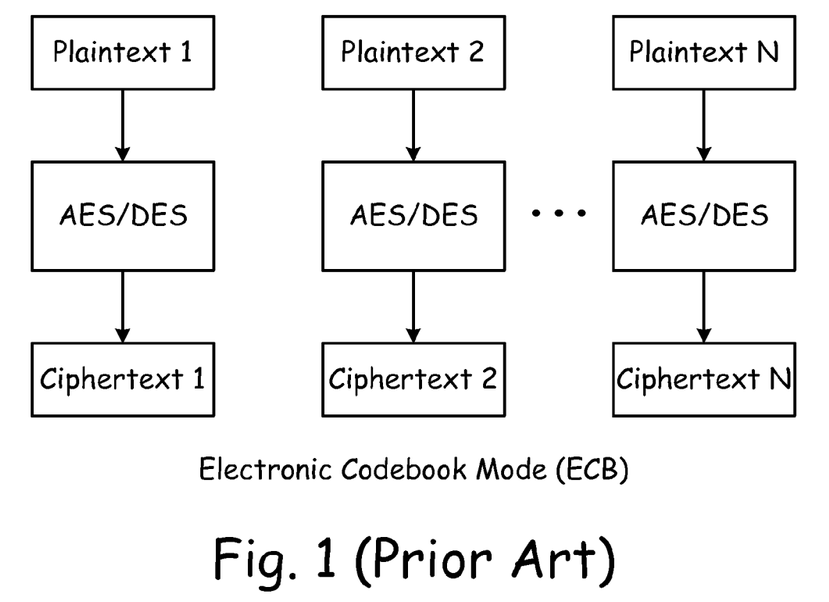
FIG. 1 is a functional block diagram of the prior art Electronic Code Book Mode. Encryption is depicted in the figure. For decryption, the arrows go in the opposite direction.
Figure 2:
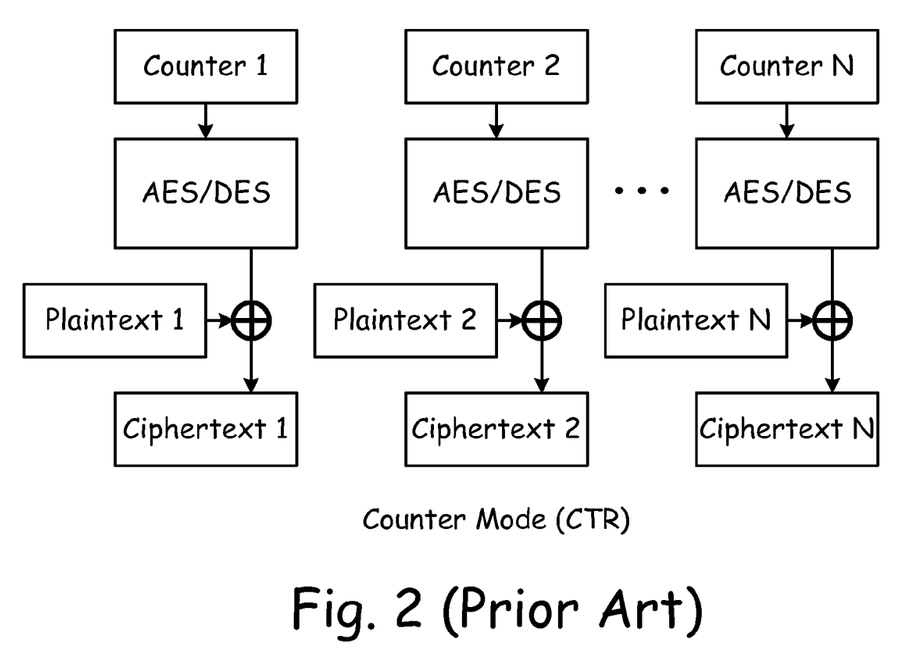
FIG. 2 is a functional block diagram of the prior art Counter Mode. Encryption is depicted in the figure. For decryption, the positions of the plaintext and ciphertext blocks are swapped. Counter i=Initialization Vector (IV)+i−1. The symbol of a cross within a circle represents an exclusive OR (XOR) operation.
Figure 3:
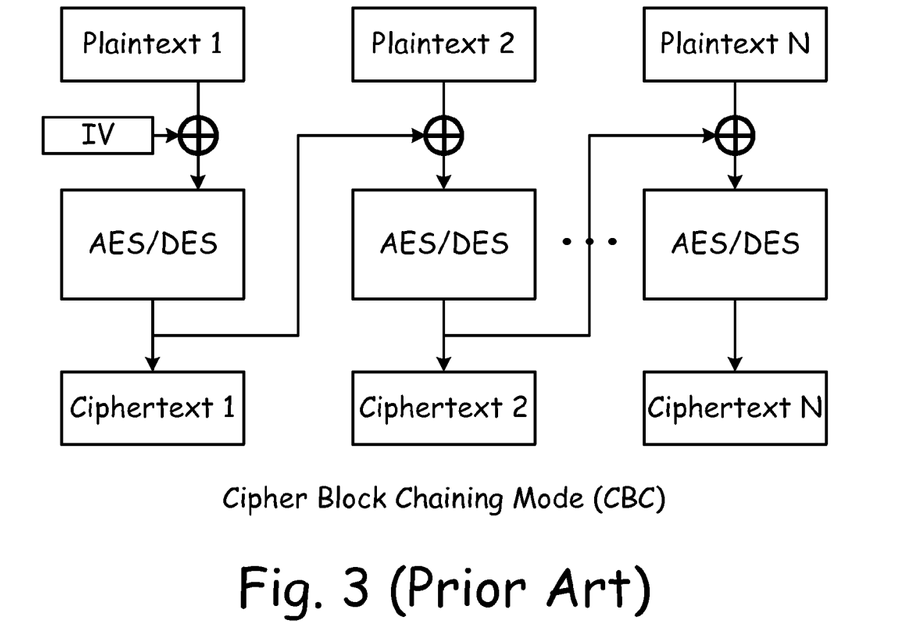
FIG. 3 is a functional block diagram of the prior art Cipher Block Chaining Mode. Encryption is depicted in the figure. For decryption, the vertical arrows go in the opposite direction. Cipher Block Chaining Mode decryption can be at speed, while Cipher Block Chaining Mode encryption depends heavily on the latency of the AES/DES unit.
Figure 4:
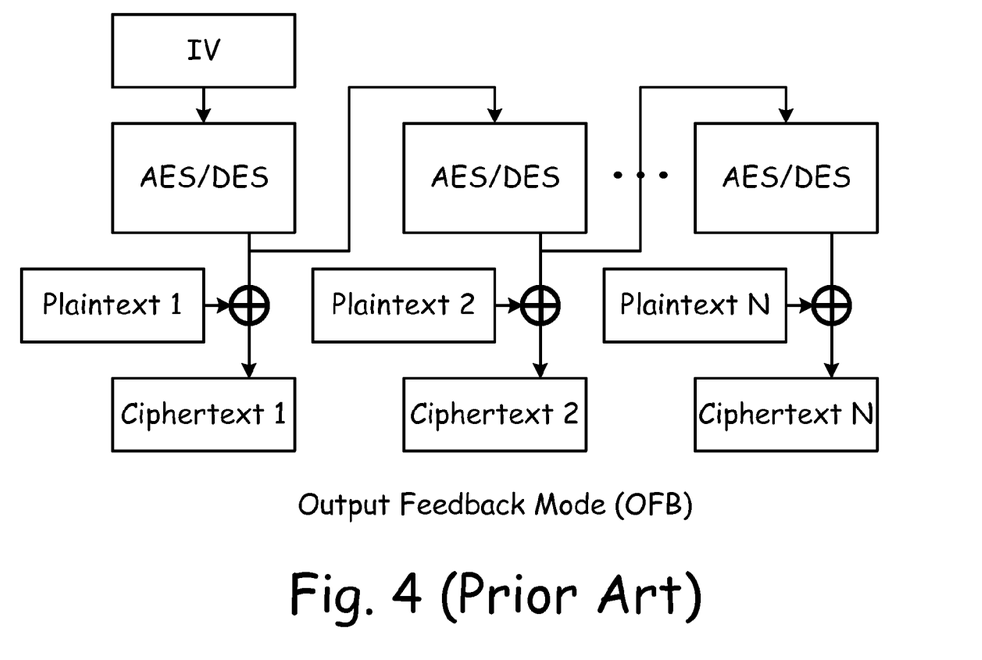
FIG. 4 is a functional block diagram of the prior art Output Feedback Mode. Encryption is depicted in the figure. For decryption, the positions of the plaintext and ciphertext blocks are swapped.
Figure 5:
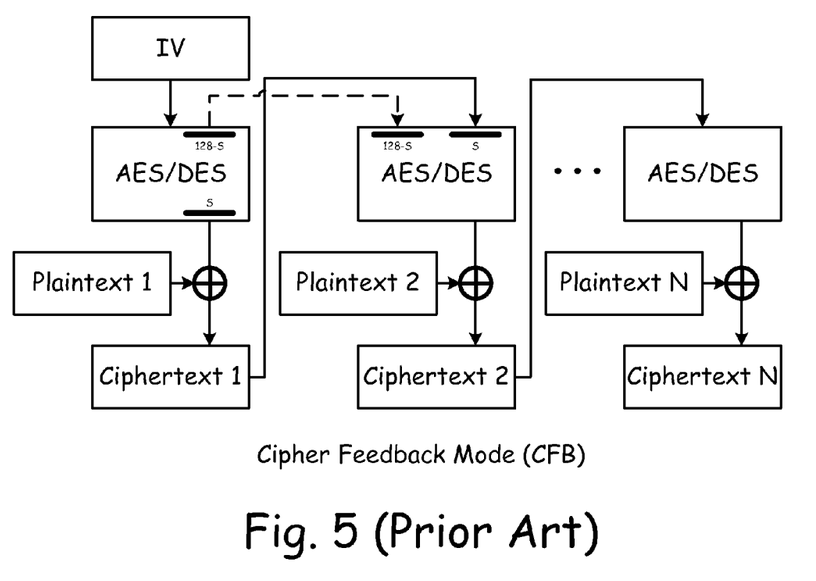
FIG. 5 is a functional block diagram of the prior art Cipher Feedback Mode. Encryption is depicted in the figure. The parameter S may be equal to 1, 8, 16, 32, 64, or 128 (128 is depicted). For decryption, the positions of the plaintext and ciphertext blocks are swapped (feedback chain arrows go from cipherblocks). It is difficult to support an arbitrary value of S in a Cipher Feedback Mode hardware implementation.
Figure 6:
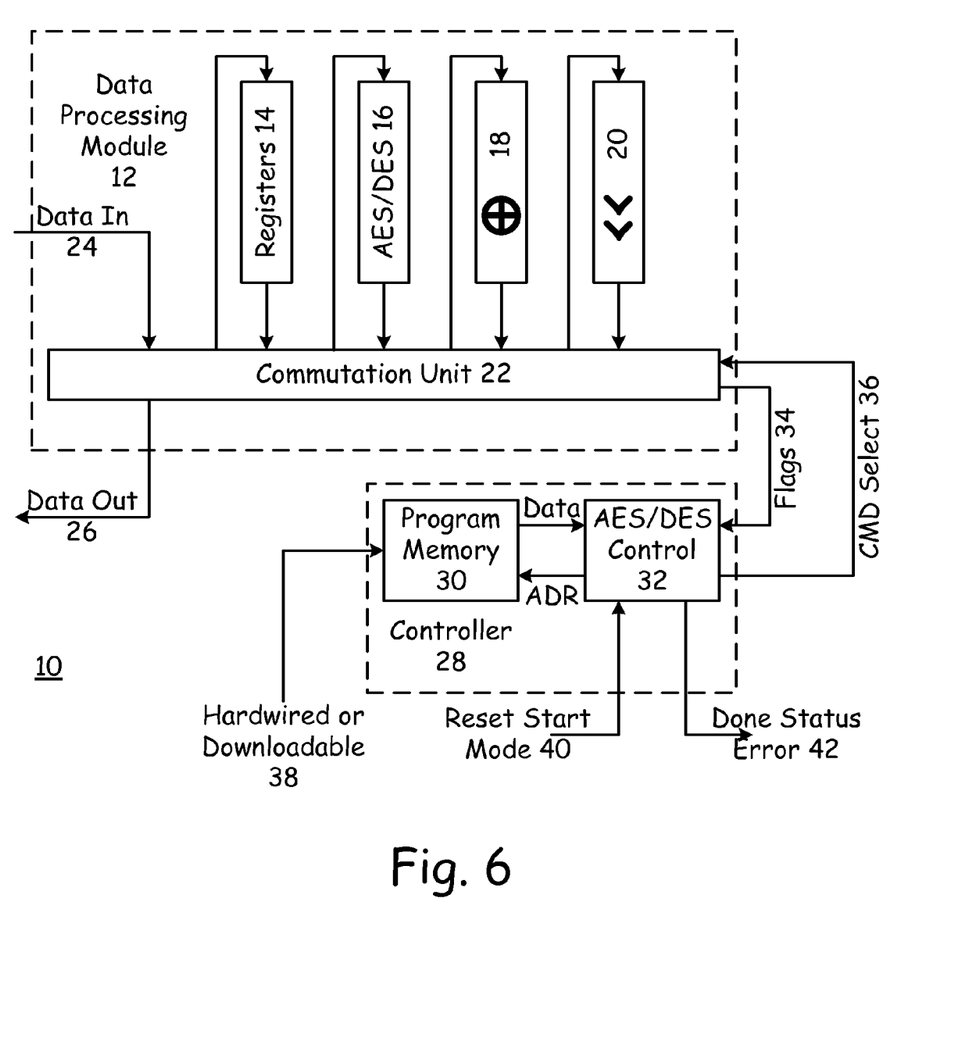
FIG. 6 is a functional block diagram of the general architecture for a data processing module according to an embodiment of the present invention, which embodiment is based on a one-round AES or DES kernel.

The general architecture 10 is depicted in FIG. 6, and consists of one or more copies of a data processing module 16 for implementing a round of the underlying block cipher, the modules 16 connected in a chain (AES, DES, or another block cipher module 16 could be used), with at least one of the modules 16 containing at least one pipe stage register 14, a data path commutation unit 22 for transferring and combining data blocks, and an optional set of auxiliary data path arithmetic 18 and storage 20 units for supporting any required modes that need such units. For example, to support all of the five NIST modes as described above and defined in SP 800-38A, an auxiliary counter 20 is required.

While the number of pipe-stage registers 14 in the two chains must be equal, the chain of block cipher modules 16 doesn't have to contain one pipe-stage register 14 per module 16. A configuration with two or three registers 14 per module 16, or a configuration with a register 14 for every two or three modules 16, or even a configuration with three registers 14 for every two modules 16, could be used. Which of these is appropriate will depend on the capabilities of the semiconductor technology and the desired clock period, and the invention is intended to be usable with any such configuration. So the number of block cipher modules 16 will in general be in some small integer ratio to the number of state registers 14, such as 1:1, 2:1, 1:2, 2:3, and so forth.

The number of block cipher round modules 16 to include is determined by balancing the desired throughput of the unit with the surface area that is available in the integrated circuit design. In one embodiment, the number is set as the maximum number of rounds that will be needed for the block cipher computation, in which case a new data block may be inserted into the circuit 10 every cycle. If fewer round modules 12 are included, then each block runs through the chain of modules 16 two or more times. Each time a block arrives at the end of the chain before the computation is finished, it is fed back to the front, in a feedback cycle. In one embodiment, new data blocks are not inserted during feedback cycles.

The present invention works regardless of the number of modules 16. However, as modules 16 are added to a design 10, the embodiment can work on more data blocks at the same time, and thus output results more frequently. However, some block cipher modes contain data dependencies that limit their ability to take advantage of extra round modules 16. A designer should carefully consider his or her requirements in determining the optimal number of round modules 16 for a given application.

Figure 7:
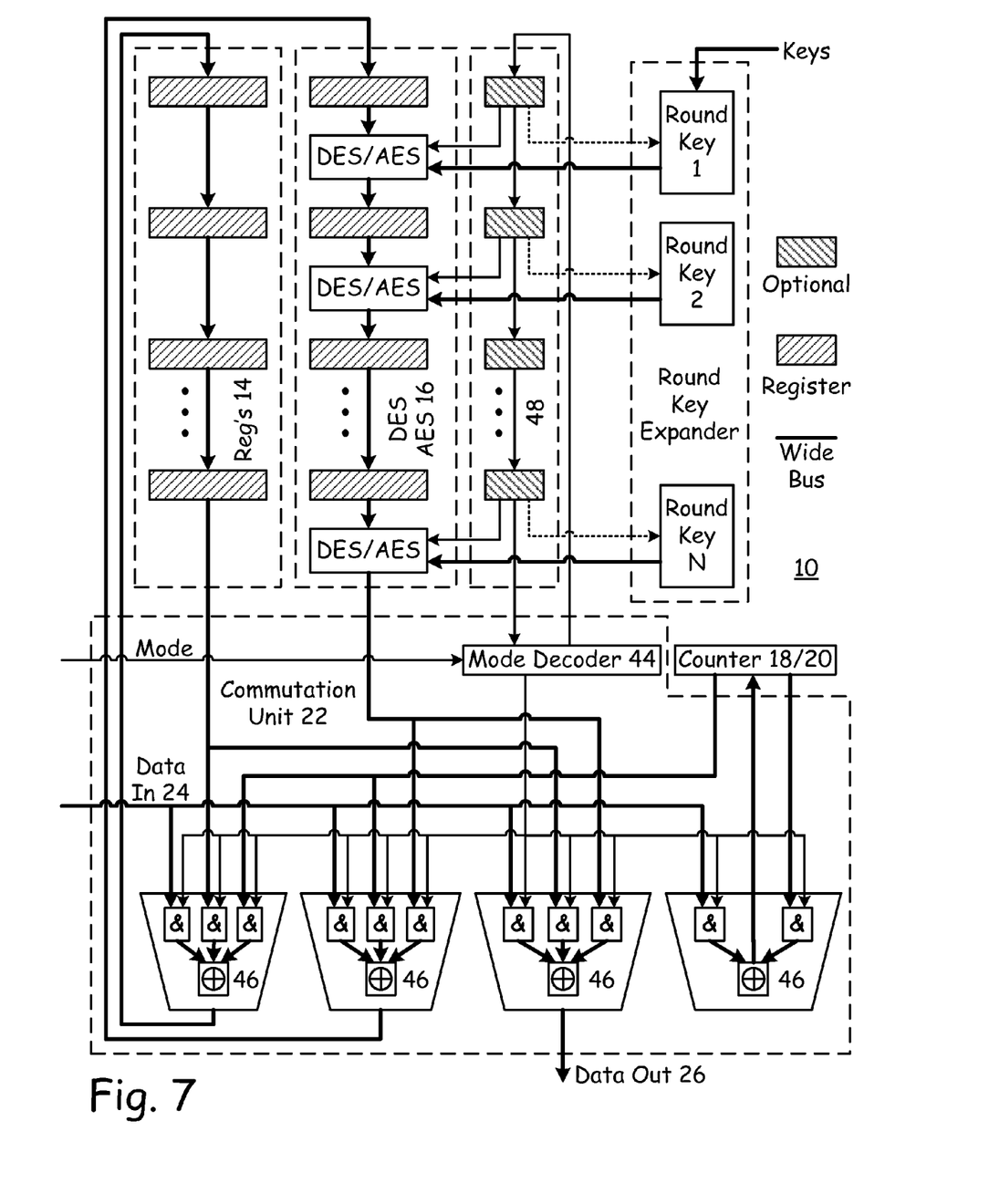
FIG. 7 is a functional block diagram of a data processing unit according to an embodiment of the present invention, which embodiment is based on a fully or partly unrolled AES or DES implementation.

One new feature of the embodiments of the present invention is the commutation unit 22. A typical example of a commutation unit 22 is given in FIG. 7, along with its corresponding data processing modules 16 and other elements of the unit 10. In this embodiment, the commutation unit 22 consists of a mode decoder 44 for directing the commutation unit 22's operation, and three or more AND-into-XOR units 46, each having a width that is the same as the block size of the underlying cipher. One of the AND/XOR units 46 generates the overall output 26, another of the AND/XOR units 46 drives the chain of block cipher round modules 16, and another of the AND/XOR units 46 drives the first register in the state pipeline 14. An additional AND/XOR unit 46 can also be provided for each auxiliary data path unit, if any. In FIG. 7, one auxiliary unit is depicted, which is the counter 18/20 that issued for the NIST modes, so four AND-into-XOR units 46 are depicted.

Each AND-into-XOR unit 46 has inputs from some subset of the design's data input 24, one or more block cipher round units 16 in the chain 10, one or more registers 14 in the state pipeline, and any auxiliary data path units 18/20. Exactly what these subsets are can vary widely within the scope of the present invention. In general, the minimal subsets are determined by the data transfer and XOR operations needed to implement all required modes. Extra inputs to AND-into-XOR units 46 generally increase the amount of area required by the design, but also make the design more flexible in the event that additional modes need to be added at a later time.

If the number of round modules 16 is a whole-integer divisor of the number of rounds in the block cipher computation, then in one embodiment the AND-into-XOR inputs 46 are connected to the last elements in the state pipeline 14 and round module 16 chain. However, in the event that the number of round modules 16 is not a whole-integer divisor of the number of rounds in the block cipher computation, then in that embodiment the connection pattern is more complicated.

Logically, the final pipe stage is not the stage physically at the end of the pipeline; instead, its position is the remainder of the number of rounds when divided by the number of round modules 16. For example, if there are fourteen rounds in the cipher and five round units in pipeline 16, then the final logical stage is stage four, although the last physical stage is stage five. In this situation, the AND-into-XOR unit 46 inputs are connected to the final logical stage of the state pipeline 14 and the round module chain 16. However, the state pipeline 14's AND-into-XOR unit 46 has one additional input from the last physical stage of the state pipeline 14. Similarly, the AND-into-XOR unit 46 that drives the round module pipeline 16 has one additional input from the last physical round unit in the chain 16. These additional inputs are activated during feedback cycles.

If the number of rounds in the computation is variable, then the connection pattern becomes even more complex. There may be two or more final logical stages. Every AND-into-XOR unit 46 with an input from a final logical stage in the state pipeline 14 or the module chain 16 will, in this embodiment, receive a duplicate for each additional final logical stage. This adds area. To avoid this expense, and the resulting extra complexity in the mode decoder, the designer may choose to use block cipher round units 16 with the capability to pass data along unchanged, and simply wait extra cycles for the cipher results to arrive at a single point in the pipeline 16.

The commutation unit 22 is controlled, in one embodiment, with one control bit for each input to each AND-into-XOR unit 46. It is the job of the mode decoder 44 to generate these bits. For each data block, these bits are generated at the beginning, at the end, and at each feedback cycle. Some modes also use one step to load an initialization vector. Each block runs through the chain of round modules 16 as many times as it needs to complete the cipher computation. The mode decoder 44 keeps track of how far along each block is in its calculation, so that it can be fed back to the front of the pipeline 16 the correct number of times. For maximum flexibility, the mode decoder 44 accepts tables that are loaded by an external controller 28. The tables provide a map between the mode identification numbers and the control bit patterns. This enables new modes to be added in the field.

The implementation of a mode in this architecture can thus be characterized by a list of desired auxiliary data path units 18/20 and a list of activated inputs to the commutation unit 22. In general, an external controller 28 is used to supply control signals and keys to the block cipher round modules 16, the auxiliary data path units 18/20, and the mode decoder 44.

Implementation of the NIST Modes

Cycles are labeled as follows: I—Insert initialization vector. B—Begin a block. F—Feedback cycle. E—End of a block. The external controller 28 applies the I and B control signals when data is inserted. In some modes, different blocks may be handled in different ways, in which case there will be B1 and B2 rules, for example. The F and E cycles occur at predictable times, and either the mode decoder 44 generates these operations internally or they are invoked by the external controller 28. The end of a block may coincide with the beginning of another block. When this occurs, the rules are combined—for example, an input is active if either rule says it is. It is an error to begin a new block during a feedback cycle.

Inputs to each AND-into-XOR unit 46 are labeled as follows: D—Data input of the overall module. S—State register pipeline 14. C—Cipher round module chain 16. A—Auxiliary Counter 18/20. In the embodiment given below, the rules for encryption and decryption are the same for the ECB, CTR, and OFB modes, and the rules are different for the CBC and CFB modes, so separate tables are provided.

| Mode | Cycle | Output State | Cipher | Auxiliary Counter |
|---|---|---|---|---|
| ECB | B | — | — | D — |
| F | — | — | C | — |
| E | C | — | — | — |
| CTR | I | — | — | DD |
| B | — | D | A | A |
| F | — | S | C | — |
| E | S, C | — | — | — |
| OFB | I | — | — | D — |
| B1 | D, C | — | C | — |
| B2 | D, C | — | — | — |
| F | — | — | C | — |
| CBC-enc | I | — | — | — D |
| B1 | — | — | D, A | — |
| B2 | — | — | D, C | — |
| F | — | — | C | — |
| E | C | — | — | — |
| CBC-dec | I | — | — | — D |
| B | — | A | D | D |
| F | — | S | C | — |
| E | S, C | — | — | — |
| CFB-enc | I | — | — | D — |
| B1 | D, C | — | D, C | — |
| B2 | D, C | — | — | — |
| F | — | — | C | — |
| E | D, C | — | — | — |
| CFB-dec | I | — | — | — D |
| B | — | D | A | D |
| F | — | S | C | — |
| E | S, C | — | — | — |

Figure 8:
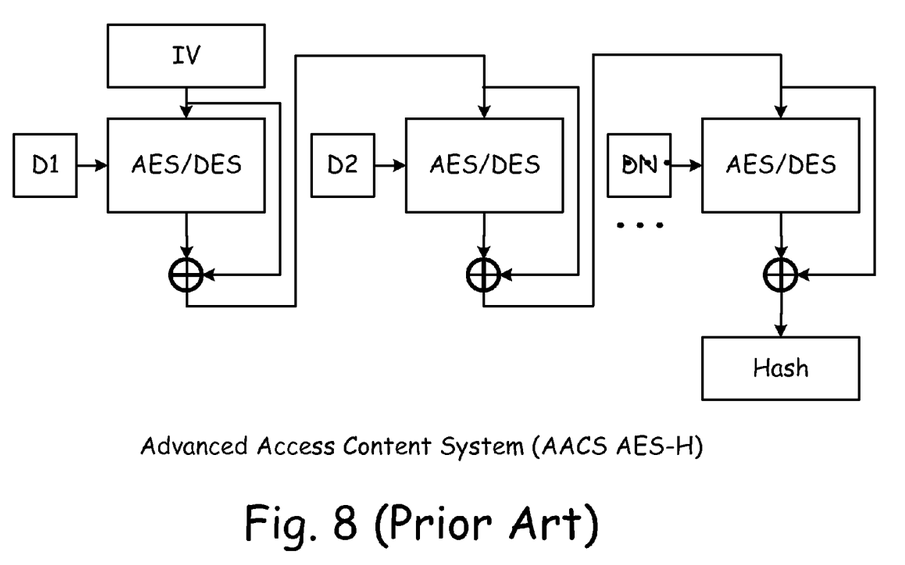
FIG. 8 is a functional block diagram of the prior art advanced encryption standard hash (AES-H) mode from Advanced Access Content System. The last data block DN requires padding in some embodiments.

The Advanced Access Content System (AACS) is an anti-piracy standard for digital media. It defines a hash function based on a new AES mode called AES-H, as depicted in FIG. 8. AES-H can be implemented in the proposed architecture as follows:

| Mode | Cycle | Output State | Cipher | Auxiliary Counter |
|---|---|---|---|---|
| AES-H | I | — | D | D — |
| B | S, C | S, C | S, C | — |
| F | — | S | C | — |
| E | S, C | — | — | — |

For maximum speed or minimum area, the conversion rules can be implemented in random logic instead of stored as tables in a random access memory. If this option is selected, then the mode decoder 44 is redesigned whenever a new mode is added.

If a designer is willing to give up more flexibility in exchange for speed and area improvement, some of the AND-into-XOR units 46 may be replaced with AND-into-OR units. For example, in the NIST mode tables, the state pipeline 14 and the auxiliary counter 18/20 are not loaded for more than one input in a given cycle, so there is no need for XORs in their AND-into-XOR units 46. However, this tends to limit possible additions to the tables. For example, the table for AES-H as given above would become infeasible in this embodiment.

Optionally, an enhanced mode decoder 48 can be designed to generate control signals for the round modules 16 or the auxiliary data path units 18/20. This allows for a simpler external controller 28.

Figure 9:
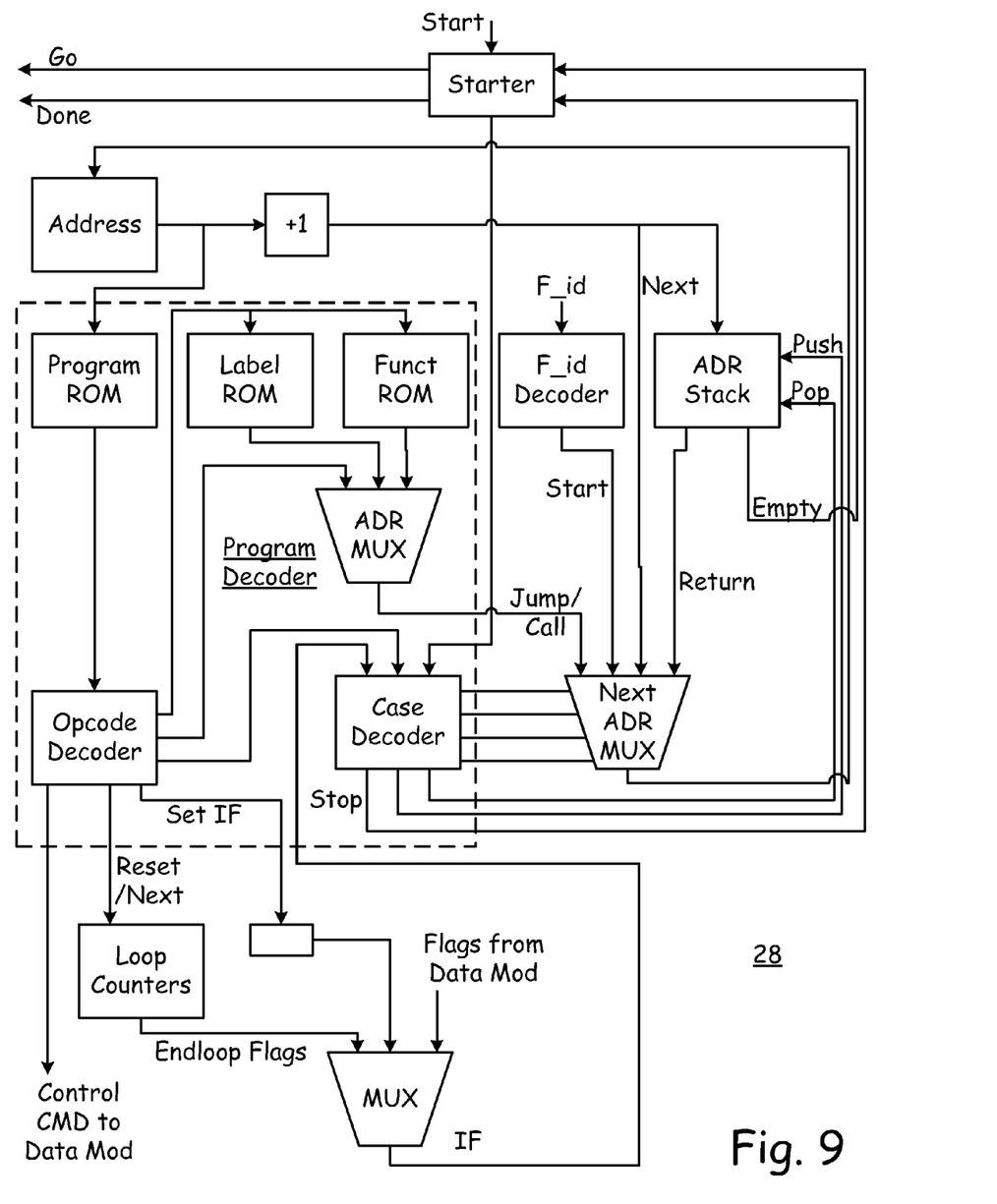
FIG. 9 is a functional block diagram of a controller according to an embodiment of the present invention.

FIG. 9 is a functional block diagram of the controller 28 according to an embodiment of the present invention.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A hardware architecture implemented in a monolithic integrated circuit for a block cipher comprising functional units that are logically reconfigurable so as to be able to both encrypt clear text into cipher text and decrypt cipher text into clear text using more than one block cipher mode, wherein the functional units comprise:

a state register pipeline including a first given number of state registers, a block cipher pipeline including a second given number of block cipher modules,
auxiliary data path arithmetic units and storage units for supporting the block cipher modes that need such units, and
a commutation unit for receiving results from both the state register pipeline and the block cipher pipeline, and additionally for feeding results that are incomplete back into both the state register pipeline and the block cipher pipeline, until the results are complete,
where the results are considered to be complete when one of, an input block of clear text is completely encrypted into cipher text according to at least one of the block cipher modes, and an input block of cipher text is completely decrypted into clear text according to at least one of the block cipher modes, wherein the block cipher modes comprise at least electronic code book, counter mode, cipher block chaining mode, output feedback mode, cipher feedback mode, and advanced encryption standard hash.

* * * * *